(12) United States Patent
Yasumura et al.

(10) Patent No.: US 11,336,143 B2
(45) Date of Patent: May 17, 2022

(54) STATOR ASSEMBLY OF A BLOWING DEVICE HAVING TERMINAL PIN SECURED TO A CIRCUIT BOARD

(71) Applicant: Nidec Corporation, Kyoto (JP)

(72) Inventors: Tsuyoshi Yasumura, Kyoto (JP); Yuta Iwasaki, Kyoto (JP); Kohei Kurazono, Kyoto (JP); Yuya Horii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 216 days.

(21) Appl. No.: 16/671,206

(22) Filed: Nov. 1, 2019

(65) Prior Publication Data

US 2020/0161924 A1 May 21, 2020

(30) Foreign Application Priority Data

Nov. 20, 2018 (JP) .............................. JP2018-217496

(51) Int. Cl.
*H02K 3/50* (2006.01)
*H02K 5/173* (2006.01)
*H02K 7/08* (2006.01)
*H02K 21/22* (2006.01)
*F04D 25/06* (2006.01)
*H02K 7/14* (2006.01)

(52) U.S. Cl.
CPC ............ *H02K 3/50* (2013.01); *F04D 25/06* (2013.01); *H02K 5/1735* (2013.01); *H02K 7/085* (2013.01); *H02K 7/14* (2013.01); *H02K 21/22* (2013.01); *H02K 2203/03* (2013.01)

(58) Field of Classification Search
CPC H02K 3/34; H02K 3/345; H02K 3/50; H02K 5/1735; H02K 7/085; H02K 7/14; H02K 21/22; H02K 2203/03

USPC ..................... 310/71, 90, 90.5, 91
See application file for complete search history.

(56) References Cited

U.S. PATENT DOCUMENTS

| 5,343,104 A * | 8/1994 | Takahashi | F04D 29/051 310/90 |
| 5,747,908 A * | 5/1998 | Saneshige | H02K 1/187 310/254.1 |
| 2014/0294621 A1* | 10/2014 | Narita | F04D 25/0646 417/354 |
| 2016/0097396 A1 | 4/2016 | Yamagata et al. | |
| 2020/0144884 A1* | 5/2020 | Hidaka | H02K 5/24 |

(Continued)

FOREIGN PATENT DOCUMENTS

JP 2013-188091 A 9/2013

*Primary Examiner* — Rashad H Johnson
(74) *Attorney, Agent, or Firm* — Keating & Bennett

(57) ABSTRACT

A stator assembly for use in a motor includes an annular stator and a circuit board. The stator having an annular shape is centered on a central axis extending vertically. The circuit board is above the stator in an axial direction. The stator includes a stator core, an insulator, a conductive wire, and a terminal pin. The stator core includes teeth. The insulator covers at least a portion of the stator core. The conductive wire is wound around the teeth via the insulator to define a coil. The terminal pin extends axially upward from an upper surface of the insulator and is connected to an end portion of the conductive wire. The circuit board includes a solder portion on an upper surface. The solder portion enables electrical connection with the terminal pin and is covered with a coating layer.

11 Claims, 8 Drawing Sheets

(56) References Cited

U.S. PATENT DOCUMENTS

2021/0099043 A1\* 4/2021 Shiraishi .................. H02K 7/14
2021/0099057 A1\* 4/2021 Shiraishi .................. H02K 7/14

\* cited by examiner

STATOR ASSEMBLY OF A BLOWING DEVICE HAVING TERMINAL PIN SECURED TO A CIRCUIT BOARD

CROSS REFERENCE TO RELATED APPLICATION

The present invention claims priority under 35 U.S.C. § 119 to Japanese Application No. 2018-217496 filed on Nov. 20, 2018 the entire contents of which are hereby incorporated by reference.

FIELD OF THE INVENTION

The present invention relates to a stator assembly, a motor, and a blowing device.

BACKGROUND

Conventional blowing devices often include a motor that rotates an impeller. The motor is an outer rotor type motor including a stationary stator and a rotating rotor. The stator includes a stator core, a coil wound around the stator core, and a circuit board on which electronic components are mounted. The stator core is held on the outer peripheral surface of a bearing liner. The bearing liner is mounted with a bearing on the inside, and the shaft of the rotor is pivotally supported in a rotatable manner. The coil is wound from above an insulator mounted to the stator core. The circuit board is mounted on the lower end side of the insulator. The terminal portion of the coil is electrically connected to a wiring pattern formed on the circuit board.

A coating agent may be applied to the surface of the circuit board. During the application of the coating agent, the coating agent may protrude from the circuit board. In the conventional configuration, there is a possibility that the coating agent protrudes from the circuit board inward in the radial direction of the circuit board, and the coating agent adheres to the inner peripheral surface of the stator core. If the coating agent adheres to the inner peripheral surface of the stator core, there is a possibility that variations occur in the mounting of the bearing liner to the stator core.

SUMMARY

An example embodiment of a stator assembly of the present disclosure is a stator assembly used in a motor, and includes a stator having an annular shape and a circuit board. The stator is centered on a central axis extending vertically. The circuit board is located above the stator in an axial direction. The stator includes a stator core, an insulator, a conductive wire, and a terminal pin. The stator core includes a plurality of teeth. The plurality of teeth surround the central axis in an annular shape and extend in a radial direction. The insulator covers at least a portion of the stator core. The conductive wire is wound around the teeth via the insulator to define a coil. The terminal pin extends axially upward from an upper surface of the insulator and is connected to an end portion of the conductive wire. The circuit board includes a solder portion on an upper surface. The solder portion enables electrical connection with the terminal pin and is covered with a coating layer. The insulator includes a groove. The groove is positioned radially inward from the circuit board and is recessed downward in the axial direction. The groove and the terminal pin overlap in the radial direction in plan view from the axial direction.

The above and other elements, features, steps, characteristics and advantages of the present disclosure will become more apparent from the following detailed description of the example embodiments with reference to the attached drawings.

DETAILED DESCRIPTION

Figure 2:
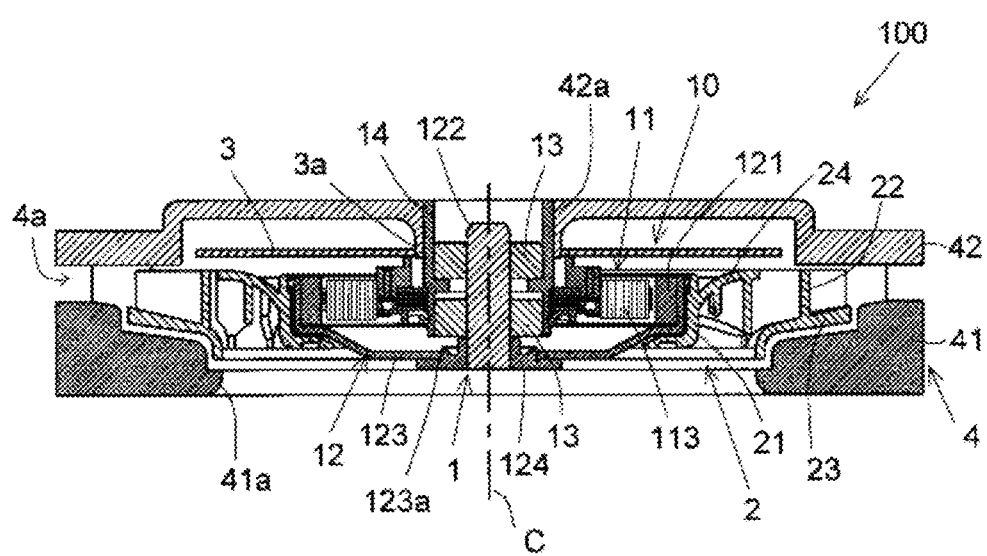
FIG. 2 is a vertical sectional view of a blowing device according to an example embodiment of the present disclosure.

Hereinafter, example embodiments of the present disclosure will be described in detail with reference to the drawings. Note that, in this specification, a direction parallel to a central axis C of a motor 1 of a blowing device 100 illustrated in FIG. 2 is referred to as an "axial direction", a direction perpendicular to the central axis C is referred to as a "radial direction", and a direction along a circular arc centered on the central axis C is referred as "circumferential direction". In addition, in this specification, the shape and positional relationship of each part will be described with the axial direction as a vertical direction and the side of which an impeller 2 is provided with a circuit board 3 as a top. However, this definition of the vertical direction is not intended to limit directions when a stator assembly 10, the motor 1, and the blowing device 100 according to the present disclosure are used.

Figure 1:
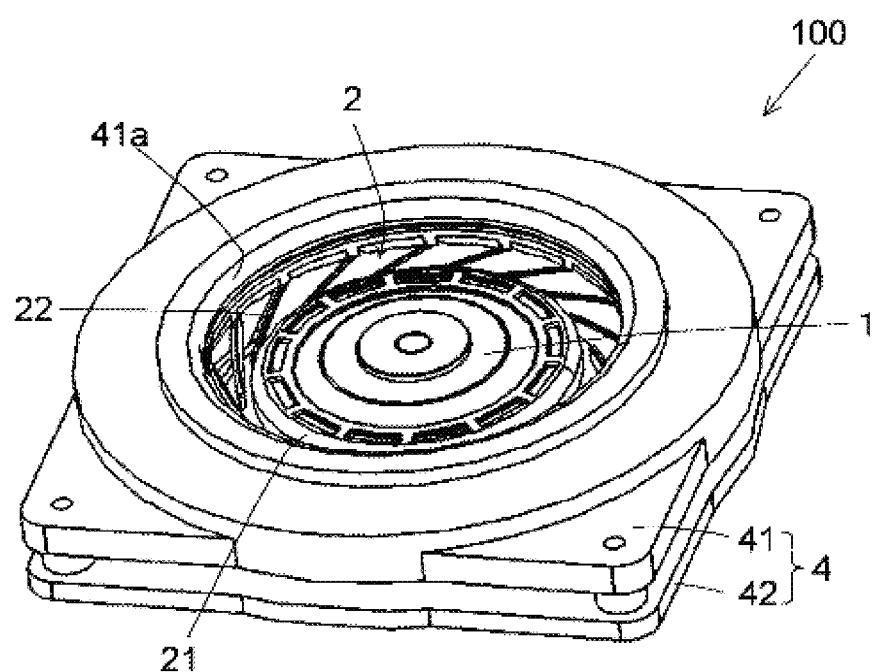
FIG. 1 is a perspective view of a blowing device according to an example embodiment of the present disclosure.

FIG. 1 is a perspective view of the blowing device 100 according to an example embodiment of the present disclosure. FIG. 1 is a view of the blowing device 100 as viewed obliquely from below. FIG. 2 is a vertical sectional view of the blowing device 100 according to the example embodiment of the present disclosure. The blowing device 100 is a centrifugal fan. As illustrated in FIGS. 1 and 2, the blowing device 100 includes the motor 1 and the impeller 2. The blowing device 100 further includes a casing 4.

The motor 1 is an outer rotor type motor. As illustrated in FIG. 2, the motor 1 includes the stator assembly 10 and a rotor 12. The motor 1 further includes a bearing 13. The stator assembly 10 includes an annular stator 11 and the circuit board 3. The stator assembly 10 further includes a bearing housing 14. In other words, the motor 1 includes the annular stator 11, the rotor 12, the bearing 13, the bearing housing 14, and the circuit board 3.

The stator 11 is an armature that has a plurality of coils 113 and generates a magnetic flux according to a drive current flowing through the coils 113. The annular stator 11 is centered on the central axis C extending vertically. The details of the stator 11 will be described later.

The rotor 12 rotates about the central axis C. The rotor 12 includes a magnet 121 that faces the stator 11 in the radial direction. In detail, the magnet 121 is arranged radially outward of the stator 11. In this example embodiment, the magnet 121 has a circular shape centered on the central axis C. However, the magnet 121 may be configured by a plurality of magnet pieces arranged in the circumferential direction.

The rotor 12 further includes a shaft 122, a rotor holder 123, and a bush 124. The shaft 122 is a columnar member centered on the central axis C and extending in the axial direction. The rotor holder 123 is a bottomed cylindrical member having an opening on the upper surface and extending in the axial direction. The magnet 121 is fixed to the inner peripheral surface of the rotor holder 123. For example, an adhesive is used to fix the magnet 121 to the rotor holder 123. The rotor holder 123 includes a holder opening 123a penetrating in the axial direction on the bottom wall. The holder opening 123a is centered on the central axis C. The bush 124 is fixed to the lower end portion of the shaft 122. The bush 124 is fitted into the holder opening 123a and is fixed to the rotor holder 123. That is, when the shaft 122 rotates, the rotor holder 123 also rotates.

The bearing 13 is arranged radially outward of the shaft 122 and supports the shaft 122 in a rotatable manner. In this example embodiment, the bearing 13 is a ball bearing. The number of the bearings 13 is two, and the two bearings 13 are arranged at intervals in the axial direction. The type and number of bearings 13 may be changed. The bearing 13 may be a sleeve bearing or the like, for example.

The bearing housing 14 has a cylindrical shape extending in the axial direction. The bearing housing 14 is arranged radially inward from the stator 11 and holds the bearing 13. In this example embodiment, the bearing housing 14 holds two bearings 13. The outer peripheral surface of the bearing 13 is fixed to the inner peripheral surface of the bearing housing 14. For example, the bearing 13 may be fixed by being press-fitted into the bearing housing 14 or may be fixed via an adhesive. The bearing housing 14 is fixed to the stator 11. The bearing housing 14 is fixed to the stator 11 by, for example, an adhesive or press-fitting.

The circuit board 3 is arranged above the stator 11 in the axial direction. The circuit board 3 is electrically connected to the stator 11. An electric circuit for supplying a drive current to a coil 113 is formed on the circuit board 3. The circuit board 3 includes a board hole 3a penetrating radially inward in the axial direction. In other words, the circuit board 3 is annular. The bearing housing 14 is arranged radially inward of the circuit board 3. The bearing housing 14 is passed through the board hole 3a.

In the motor 1, when a drive current is supplied to the stator 11, rotational torque is generated between the magnet 121 and the stator 11. Accordingly, the rotor 12 rotates with respect to the stator 11. In this example embodiment, the assembly process of the motor 1 includes an application process of applying a coating agent to the circuit board 3. In the motor 1 of this example embodiment, the coating agent can be suppressed from adhering to the inside of the stator 11 during assembly, and the motor 1 can be manufactured efficiently.

The impeller 2 rotates with the rotor 12. As illustrated in FIGS. 1 and 2, the impeller 2 includes a boss part 21, a plurality of blade parts 22, a lower shroud 23, and an upper shroud 24. In this example embodiment, the boss part 21, the plurality of blade parts 22, the lower shroud 23, and the upper shroud 24 are a single member. However, at least one of these members 21 to 24 may be a separate member.

The boss part 21 has a cylindrical shape extending in the axial direction. The boss part 21 is arranged radially outward of the rotor holder 123 and is fixed to the outer peripheral surface of the rotor holder 123. The boss part 21 is fixed to the rotor holder 123 by, for example, press fitting or adhesion. Specifically, the boss part 21 has a circular boss protruding part protruding radially inward at the lower end in the axial direction. The boss protruding part may not be provided. For example, a weight member that performs balance adjustment can be arranged on the boss protruding part.

The blade part 22 is arranged radially outward of the boss part 21 and extends in a direction away from the central axis C. The plurality of blade parts 22 are arranged at intervals in the circumferential direction. Specifically, the blade part 22 faces the boss part 21 through a gap in the radial direction. However, the blade part 22 may be connected to the boss part 21.

The lower shroud 23 has an annular shape centered on the central axis C. The lower shroud 23 is arranged radially outward from the boss part 21 rather than the radially inner end of the blade part 22. The upper surface of the lower shroud 23 is connected to the radially outer lower surface of each blade part 22. That is, the lower shroud 23 is connected to a radially outer portion of the plurality of blade parts 22.

The upper shroud 24 has an annular shape centered on the central axis C. The radially inner end of the upper shroud 24 is connected to the outer peripheral surface of the boss part 21. The radially inner upper surface of each blade part 22 is connected to the lower surface of the upper shroud 24. That is, the upper shroud 24 is connected to a radially inner portion of the plurality of blade parts 22. The plurality of blade parts 22 are connected to the lower shroud 23 and the upper shroud 24.

The casing 4 accommodates the motor 1 and the impeller 2. As illustrated in FIGS. 1 and 2, the casing 4 includes a lower casing 41 and an upper casing 42.

The lower casing 41 is arranged below the impeller 2 in the axial direction. The lower casing 41 has an intake port 41a penetrating in the axial direction at the central portion. In plan view from below in the axial direction, a portion of the motor 1 and the impeller 2 is exposed to the outside through the intake port 41a. Specifically, the lower casing 41 has a cylindrical shape with an outer rectangular shape in which four corners are combined on the outer periphery of a cylindrical portion extending in the axial direction. The intake port 41a is circular. However, the lower casing 41 may have another shape such as a cylindrical shape. The shape of the intake port 41a may be other than a circular shape. By providing the lower casing 41, the occurrence of turbulent flow around the lower shroud 23 can be suppressed, and the blowing device 100 can efficiently send out air in the centrifugal direction.

The upper casing 42 is arranged above the impeller 2 in the axial direction. The upper casing 42 has a rectangular shape in plan view from the axial direction and has approximately the same size as the lower casing 41. In plan view from the axial direction, the four corners of the lower casing 41 and the four corners of the upper casing 42 overlap. In this example embodiment, the lower casing 41 and the upper casing 42 are fixed by screws arranged at four corners. In the central portion of the upper casing 42, an upper casing hole 42a penetrating in the axial direction is provided. The axial upper portion of the bearing housing 14 is inserted into the upper casing hole 42*a*. The bearing housing 14 is fixed to the upper casing 42.

In the blowing device 100, air is sucked from the intake port 41*a* of the lower casing 41 by the rotation of the impeller 2. The air sucked from the intake port 41*a* is turned inside the casing 4 in the circumferential direction by the rotation of the impeller 2 and then is discharged from an exhaust port 4*a* provided in an axial space between the lower casing 41 and the upper casing 42. The lower shroud 23 and the upper shroud 24 efficiently guide the air drawn from the intake port 41*a* into the casing 4 to the exhaust port 4*a*, thereby improving the blowing efficiency of the blowing device 100. In this example embodiment, the exhaust port 4*a* is provided in the entire circumferential area of the casing 4. However, the exhaust port 4*a* may be provided only in a circumferential portion of the casing 4. In this example embodiment, the motor 1 can be efficiently manufactured, and thus the blowing device 100 can be efficiently manufactured.

Figure 3:
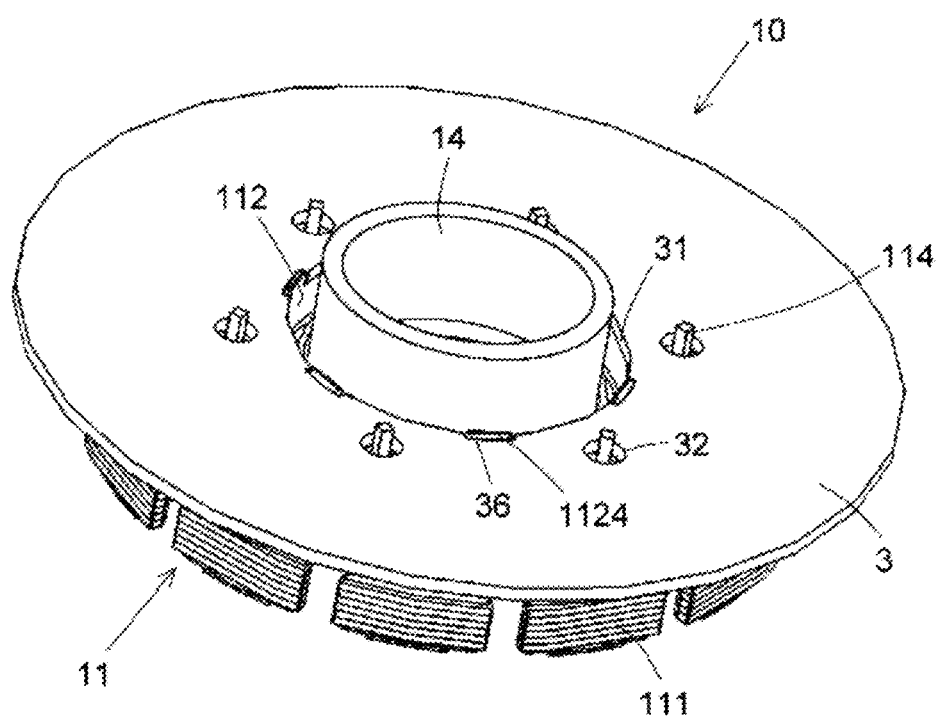
FIG. 3 is a perspective view of a stator assembly according to an example embodiment of the present disclosure.

FIG. 3 is a perspective view of the stator assembly 10 according to the example embodiment of the present disclosure. The stator assembly 10 is used for the motor 1. As illustrated in FIG. 3, the stator assembly 10 includes the stator 11, the circuit board 3, and the bearing housing 14.

Figure 4:
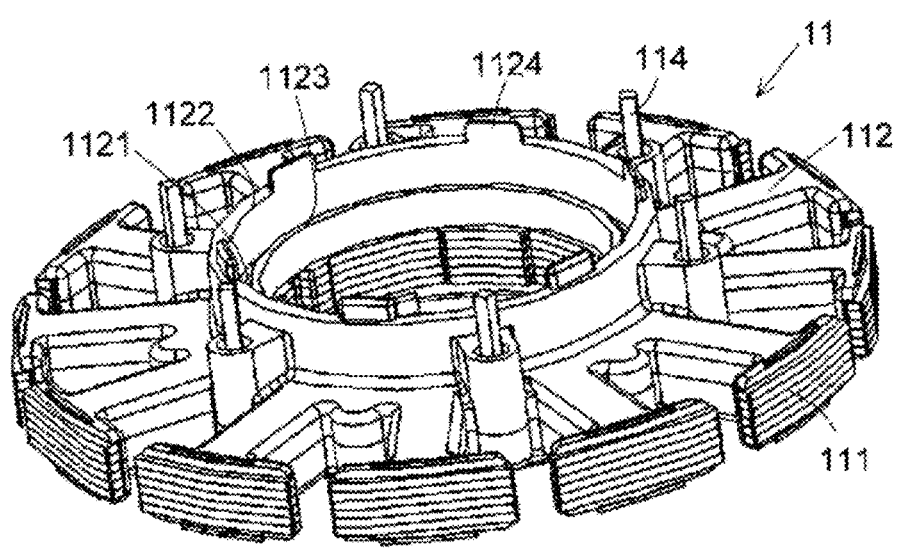
FIG. 4 is a perspective view of a stator according to an example embodiment of the present disclosure.
Figure 5:
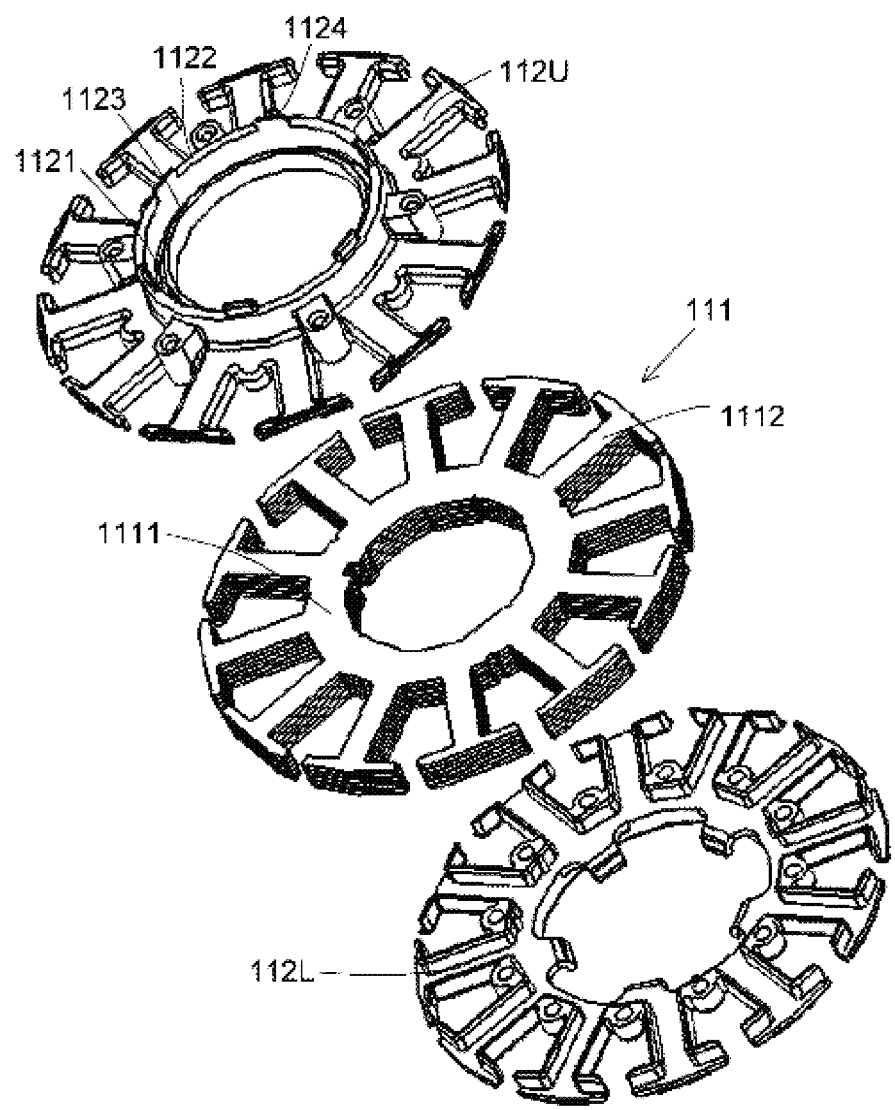
FIG. 5 is an exploded perspective view of the stator illustrated in FIG. 4.
Figure 6:
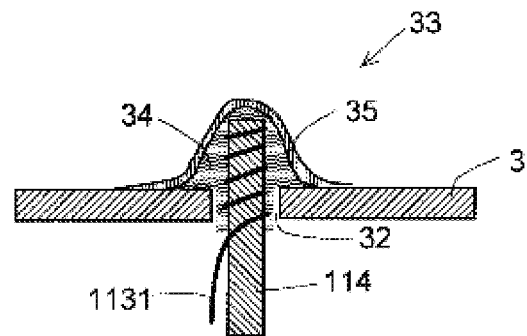
FIG. 6 is a schematic view illustrating a configuration of a solder portion provided on a circuit board 3.

FIG. 4 is a perspective view of the stator 11 according to the example embodiment of the present disclosure. In FIG. 4, a conductive wire 1131 configuring the coil 113 is omitted. The conductive wire 1131 is illustrated in FIG. 6 to be described below. FIG. 5 is an exploded perspective view of the stator 11 illustrated in FIG. 4. In FIG. 5, the terminal pins 114 illustrated in FIG. 4 are omitted. The stator 11 includes a stator core 111, an insulator 112, the conductive wire 1131, and the terminal pin 114.

The stator core 111 is a magnetic body. The stator core 111 is configured by laminating electromagnetic steel plates, for example. However, the stator core 111 may be configured by joining a plurality of core pieces, for example. As illustrated in FIG. 5, the stator core 111 has a plurality of teeth 1112. The stator core 111 further includes a core back 1111.

The plurality of teeth 1112 surround the central axis C in an annular shape and extend in the radial direction. The core back 1111 has an annular shape centered on the central axis C. The plurality of teeth 1112 extend radially outward from the core back 1111. The plurality of teeth 1112 are arranged at intervals in the circumferential direction. Specifically, the plurality of teeth 1112 are arranged at equal intervals in the circumferential direction. In this example embodiment, the number of teeth 1112 is twelve.

The insulator 112 covers at least a part of the stator core 111. The insulator 112 is an insulation body and is configured using, for example, a resin. In this example embodiment, as illustrated in FIG. 5, the insulator 112 includes an upper insulator 112U and a lower insulator 112L. The upper insulator 112U is arranged above the stator core 111 in the axial direction. The lower insulator 112L is arranged below the stator core 111 in the axial direction. The upper insulator 112U covers the stator core 111 from above. The lower insulator 112L covers the stator core 111 from below.

The conductive wire 1131 is wound around the teeth 1112 via the insulator 112, so as to configure the coil 113. The coil 113 is formed on each of the teeth 1112. The number of coils 113 is the same as the number of teeth 1112. In this example embodiment, the number of coils 113 is twelve. Note that, in this example embodiment, the coils 113 include U-phase coils, V-phase coils, and W-phase coils. That is, the motor 1 having the stator 11 is a three-phase motor.

The terminal pin 114 extends axially upward from the upper surface of the insulator 112. The terminal pin 114 is connected to the end portion of the conductive wire 1131. Specifically, the terminal pin 114 has a columnar shape extending in the axial direction. The lower portion of the terminal pin 114 is held by the insulator 112, and the upper portion protrudes from the upper surface of the insulator 112. The terminal pin 114 is inserted into, for example, a through hole which is provided in the insulator 112 to penetrate in the axial direction or a recess part recessed downward in the axial direction, and is held by the insulator 112. In this example embodiment, the end portion of the conductive wire 1131 is wound around the terminal pin 114, for example. However, the end portion of the conductive wire 1131 may not be wound around the terminal pin 114. The end portion of the conductive wire 1131 is fixed to the terminal pin 114 by solder, for example, and is electrically connected to the terminal pin 114.

The stator 11 has a plurality of terminal pins 114. The plurality of terminal pins 114 are arranged between two adjacent teeth 1112. The plurality of terminal pins 114 are arranged at equal intervals in the circumferential direction. In the coil 113 of each phase of the U phase, the V phase, and the W phase, there are provided the terminal pin 114 around which the winding-start end portion is wound and the terminal pin 114 around which the winding-end end portion is wound. For this reason, in this example embodiment, the number of terminal pins 114 is six. The electrical connection of the coil 113 of each phase is performed on the circuit board 3. However, the number of terminal pins 114 need not be six. For example, the conductive wires 1131 configuring the U-phase, V-phase, and W-phase coils 113 may be connected, and the number of terminal pins 114 may be four.

As illustrated in FIG. 3, the circuit board 3 has a board inner end surface 31 radially facing the central axis C inward in the radial direction. In this example embodiment, the circuit board 3 is annular. More specifically, the circuit board 3 has a circular shape. The board inner end surface 31 has a circular shape in plan view from the axial direction. However, the shape of the circuit board 3 may be other shapes. For example, the circuit board may have a shape in which the board inner end surface has a circular arc shape in plan view from the axial direction. As an example of such a shape, the circuit board may be, for example, a shape obtained by halving the circular circuit board 3 described above. In addition, for example, the circuit board may have an annular structure in which the board inner end surface is polygonal in plan view from the axial direction. In addition, the circuit board may have a shape obtained by equally dividing the circuit board having such an annular structure into a plurality of parts.

As illustrated in FIG. 3, the circuit board 3 is provided with pin holes 32 penetrating in the axial direction. The pin hole 32 is a hole through which the terminal pin 114 passes. By arranging the circuit board 3 on the stator 11, the terminal pin 114 passes through the pin holes 32. In this example embodiment, the terminal pin 114 protrudes upward in the axial direction from the upper surface of the circuit board 3. The same number of pin holes 32 as the terminal pins 114 are provided. In this example embodiment, the number of pin holes 32 is six. Six pin holes 32 are arranged at equal intervals in the circumferential direction.

The circuit board 3 has a solder portion 33 on the upper surface. Note that, in FIG. 3, the solder portion 33 is not illustrated. FIG. 6 is a schematic view illustrating a configuration of the solder portion 33 provided on the circuit board 3. The solder portion 33 enables electrical connection with the terminal pin 114. Specifically, the solder portion 33 enables electrical connection between the circuit board 3 and the terminal pins 114 via the solder 34. The solder 34 is electrically connected to connection pads (not illustrated) provided on the upper surface of the circuit board 3. The terminal pin 114 is electrically connected to the conductive wire 1131. For this reason, the circuit board 3 and the conductive wire 1131 are also electrically connected.

The solder portion 33 is covered with a coating layer 35. The coating layer 35 is arranged for the purpose of moisture prevention and insulation, for example. The coating layer 35 may be formed using, for example, a coating agent mainly formed of a polyolefin resin. The coating agent may be, for example, HumiSeal (registered trademark). In this example embodiment, the coating layer 35 is provided not on the entire upper surface of the circuit board 3 but on the solder portion 33 and the periphery thereof. The coating layer 35 may be provided on the entire upper surface of the circuit board 3.

Figure 7:
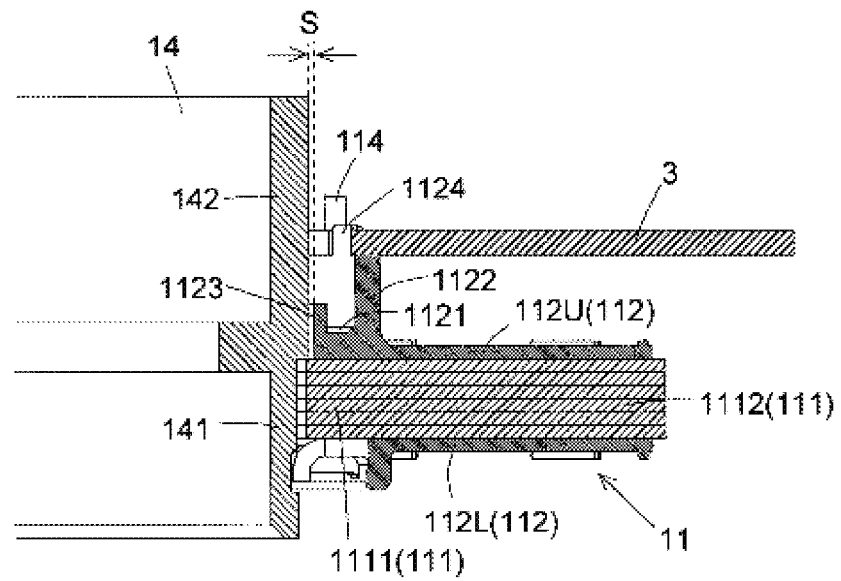
FIG. 7 is an enlarged vertical sectional view illustrating a relationship between the stator and a bearing housing.

FIG. 7 is an enlarged vertical sectional view illustrating a relationship between the stator 11 and the bearing housing 14. As illustrated in FIG. 7, the bearing housing 14 has a small-diameter cylindrical part 141 and a large-diameter cylindrical part 142 having different outer diameters. The small-diameter cylindrical part 141 and the large-diameter cylindrical part 142 have cylindrical shapes extending in the axial direction. The small-diameter cylindrical part 141 has a smaller radial width than that of the large-diameter cylindrical part 142. The small-diameter cylindrical part 141 is positioned below the large-diameter cylindrical part 142 in the axial direction. On the outer peripheral surface of the bearing housing 14, a step is formed at the boundary between the small-diameter cylindrical part 141 and the large-diameter cylindrical part 142.

The radially inner upper surface of the core back 1111 is not covered with the upper insulator 112U. In the bearing housing 14, the radially outer lower surface of the large-diameter cylindrical part 142 is placed on the upper surface of the core back 1111. That is, the bearing housing 14 is axially positioned by the upper surface of the stator core 111. In this example embodiment, the outer peripheral surface of the small-diameter cylindrical part 141 is fixed to the inner peripheral surface of the stator core 111 via an adhesive. The adhesive preferably has elasticity.

Figure 8:
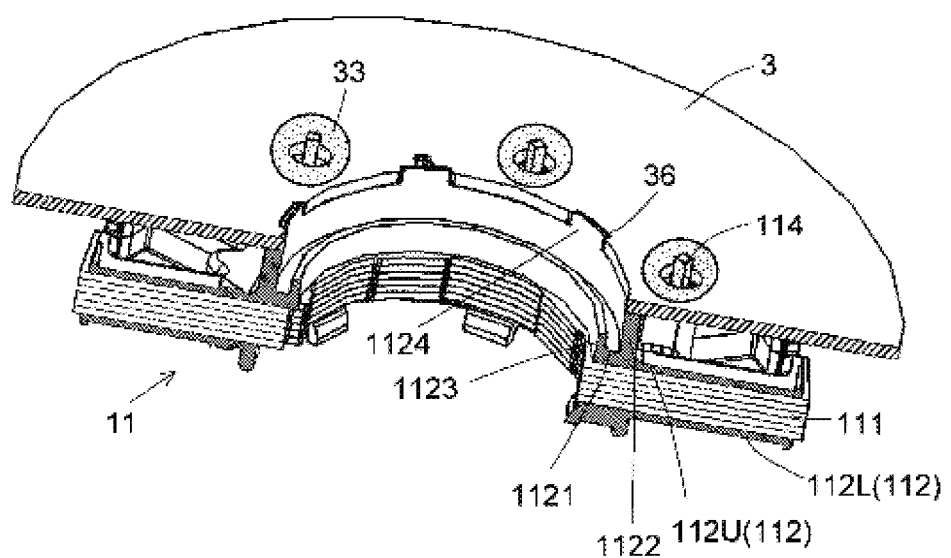
FIG. 8 is a cross-sectional perspective view of the stator assembly according to an example embodiment of the present disclosure.

FIG. 8 is a cross-sectional perspective view of the stator assembly 10 according to the example embodiment of the present disclosure. In FIG. 8, the bearing housing 14 and the conductive wire 1131 are omitted. In FIG. 8, the solder portion 33 is schematically illustrated.

As illustrated in FIG. 8, the insulator 112 has a groove 1121. The groove 1121 is positioned radially inward from the circuit board 3. The groove 1121 is recessed downward in the axial direction. The groove 1121 and the terminal pin 114 overlap in the radial direction in plan view from the axial direction. Note that, the entire groove 1121 is preferably positioned radially inward from the circuit board 3. However, a part of the groove 1121 may be positioned radially inward from the circuit board 3. In this example embodiment, the groove 1121 is positioned axially below the upper surface of the circuit board 3 and is positioned axially above the upper surface of the stator core 111.

When the stator assembly 10 is assembled, there is a step of applying a coating agent in order to form the coating layer 35 of the solder portion 33. The solder portion 33 is arranged radially inward, and the coating agent may protrude from the radially inner side of the circuit board 3 when the coating agent is applied. The coating agent protruding from the radially inner side of the circuit board 3 may adhere to the radially inner side of the stator core 111. If the coating agent adheres to the radially inner side of the stator core 111, for example, the bearing housing 14 may not be properly attached to the stator core 111. In this regard, according to the configuration of this example embodiment, the coating agent protruding from the radially inner side of the circuit board 3 can be received by the groove 1121. Therefore, it is possible to suppress the coating agent protruding from the radially inner side of the circuit board 3 from adhering to the radially inner side of the stator core 111 or the like.

In this example embodiment, the groove 1121 is provided in an annular shape over the entire circumference in the circumferential direction. Specifically, the groove 1121 has a circular shape. However, the groove 1121 only needs to be provided at a position overlapping the terminal pin 114 in the radial direction in plan view from the axial direction. For this purpose, for example, a plurality of circular arc grooves may be arranged at intervals in the circumferential direction. In addition, for example, when the terminal pin 114 is arranged at a position deviated in the circumferential direction, only one circular arc groove may be arranged. As in this example embodiment, regardless of the position of the terminal pin 114, it is preferable to provide the grooves 1121 over the entire circumference in the circumferential direction. Accordingly, the coating agent that hangs downward from the radially inner end of the circuit board 3 enters the groove 1121, thereby suppressing the coating agent from adhering to the inner peripheral surface of the stator core 111.

Specifically, the insulator 112 includes a cylindrical first wall part 1122 and a second wall part 1123. More specifically, the first wall part 1122 and the second wall part 1123 are provided on the upper insulator 112U. In other words, the first wall part 1122 and the second wall part 1123 are provided at the axial upper portion of the insulator 112. The cylindrical first wall part 1122 is provided radially inward of the insulator 112 and extends in the axial direction. The cylindrical first wall part 1122 is provided radially inward of the upper insulator 112U. The second wall part 1123 is arranged radially inward from the first wall part 1122, and extends in the axial direction. In this example embodiment, the radially inner end surface of the second wall part 1123 configures the radially inner end surface of the upper insulator 112U. The second wall part 1123 is cylindrical. When the groove 1121 is not provided over the entire circumference in the circumferential direction, the second wall part 1123 may not be cylindrical.

The groove 1121 is formed by being surrounded by the first wall part 1122 and the second wall part 1123. The upper surface of the first wall part 1122 is positioned below the lower surface of the circuit board 3 in the axial direction. In this example embodiment, the upper surface of the first wall part 1122 and the lower surface of the circuit board 3 come into contact with each other. That is, the radially inner side of the circuit board 3 is placed on the circuit board 3. However, the upper surface of the first wall part 1122 and the lower surface of the circuit board 3 may be arranged apart from each other in the axial direction.

At least a part of the board inner end surface 31 is positioned radially inward from the radially outer end surface of the first wall part 1122 and radially outward from the radially outer end surface of the second wall part 1123. According to this, when the coating agent is applied, the coating agent that hangs downward from the radially inner end from the circuit board 3 can be received by the groove 1121. For this reason, it is possible to suppress the coating agent from adhering to the radially inner side of the stator core 111 or the like.

The board inner end surface 31 preferably overlaps the upper surface of the first wall part 1122 in the axial direction. According to this, the coating agent that hangs downward from the radially inner end of the circuit board 3 can easily enter the groove 1121. According to this, it is possible to further suppress the coating agent from hanging downward radially outward from the first wall part 1122 and adhering to the coil 113. The board inner end surface 31 and the radially inner end surface of the first wall part 1122 preferably have the same radial position.

In this example embodiment, the board inner end surface 31 is provided with recess parts 36 recessed radially outward. For this reason, the radial positions of the board inner end surface 31 are not all the same. In this example embodiment, the number of the recess parts 36 is plural, specifically six. The number of the recess parts 36 may be changed and may be singular. The recess part 36 may not be provided.

In this example embodiment, the board inner end surface 31 overlaps the upper surface of the first wall part 1122 in the axial direction regardless of the presence or absence of the recess part 36. However, the board inner end surface 31 may be positioned radially outward from the radially outer end surface of the first wall part 1122 at the position where the recess part 36 is provided. In this example embodiment, at the position where the recess part 36 is not provided, the board inner end surface 31 and the radially inner end surface of the first wall part 1122 have the same radial position.

A protruding part 1124 that protrudes upward in the axial direction is provided on the upper surface of the first wall part 1122. In this example embodiment, the protruding part 1124 has a rectangular shape in plan view from the radial direction. However, the shape of the protruding part 1124 may be another shape such as a semicircular shape in plan view from the radial direction. In this example embodiment, the radially inner end surface of the protruding part 1124 has the same radial position as the radially inner end surface of the first wall part 1122. The radially outer end surface of the protruding part 1124 is positioned radially inward from the radially outer end surface of the first wall part 1122. That is, the first wall part 1122 has a space for placing the circuit board 3 on the radially outer side of the protruding part 1124. A plurality of protruding parts 1124 are provided. In this example embodiment, the number of the protruding parts 1124 is six. However, the number of the protruding parts 1124 may be changed and may be singular. The protruding part 1124 may not be provided.

The protruding part 1124 is arranged in the recess part 36. The protruding part 1124 is positioned in the recess part 36 of the circuit board 3 placed on the upper surface of the first wall part 1122. Note that, the entire protruding part 1124 is not necessarily positioned in the recess part 36. For example, the axial upper portion of the protruding part 1124 may be outside the recess part 36. Further, for example, the radially inner end surface of the protruding part 1124 may be outside the recess part 36. When the protruding part 1124 is arranged in the recess part 36, the rotation of the circuit board 3 in the circumferential direction and the movement in the radial direction are suppressed by the protruding part 1124, and the circuit board 3 can be positioned. In this example embodiment, the lower surface of the circuit board 3 and the upper surface of the first wall part 1122 come into contact with each other even on the radially outer side of the protruding part 1124. This can suppress the coating agent from adhering to the coil 113.

Figure 9:
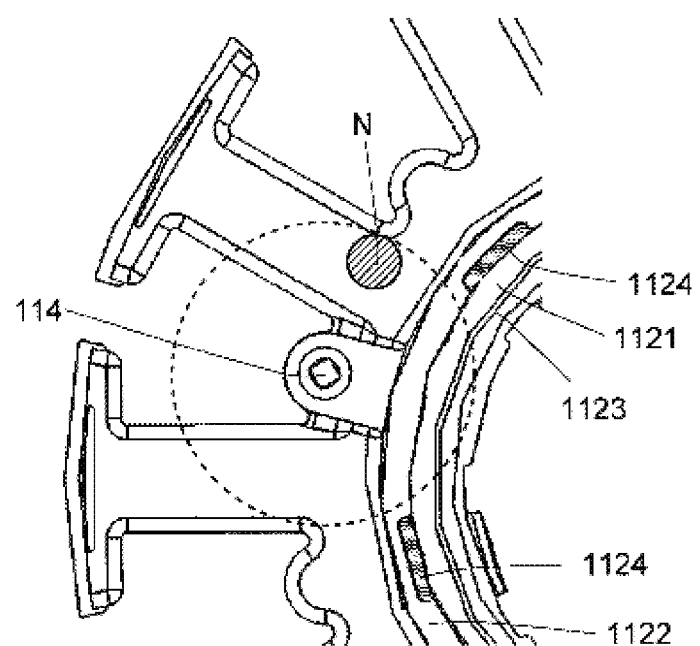
FIG. 9 is an enlarged plan view illustrating a relationship between a terminal pin and a protruding portion.

FIG. 9 is an enlarged plan view illustrating a relationship between the terminal pin 114 and the protruding part 1124. As illustrated in FIG. 9, the terminal pin 114 is arranged radially outward from the first wall part 1122. The terminal pin 114 and the protruding part 1124 are different in the circumferential position. That is, the terminal pin 114 and the protruding part 1124 do not overlap in the radial direction. In this example embodiment, the terminal pin 114 is present at a position shifted radially outward from a circumferential intermediate point between two protruding parts 1124 adjacent in the circumferential direction.

In this example embodiment, the end portion of the conductive wire 1131 drawn from the coil 113 is wound around the terminal pin 114 using a winding machine. When the conductive wire 1131 is wound around the terminal pin 114 using the winding machine, a winding nozzle N of the winding machine turns around the terminal pin 114 as illustrated in FIG. 9. In this example embodiment, the circumferential positions of the terminal pin 114 and the protruding part 1124 are shifted, and thus it is possible to prevent the turning winding nozzle N from colliding with the protruding part 1124. As a result, an axial range in which the conductive wire 1131 is wound around the terminal pin 114 can be secured without increasing the length of the terminal pin 114. The stator assembly 10 can be thinned.

As illustrated in FIG. 7, a gap S is provided between the second wall part 1123 and the bearing housing 14 in the radial direction. However, the radially inner end surface of the second wall part 1123 and the radially outer end surface of the bearing housing 14 may come into contact with each other. By providing the gap S, the bearing housing 14 can be easily inserted into the radially inner side of the stator 11. Further, by providing the gap S, it is possible to suppress a large force from being applied to the insulator 112 from the bearing housing 14 when the resin insulator 112 expands due to a temperature change.

As illustrated in FIGS. 7 and 8, the upper surface of the second wall part 1123 is positioned below the upper surface of the first wall part 1122 in the axial direction. However, the axial heights of the upper surfaces of the first wall part 1122 and the second wall part 1123 may be the same. If the upper surface of the second wall part 1123 is lowered, when the bearing housing 14 is inserted into the radially inner side of the stator 11 from the axial upper side, assembly work can be facilitated since the opening of the inlet portion becomes larger. In addition, if the upper surface of the second wall part 1123 is lowered, it is possible to prevent the brush used for application from hitting the second wall part 1123 when the coating agent is applied, thereby suppressing the coating agent from hanging out of the groove 1121. In addition, if the upper surface of the second wall part 1123 is lowered, the depth of the groove 1121 can be reduced to the minimum necessary depth, and the insulator 112 using a mold can be easily molded.

As illustrated in FIGS. 7 and 8, the second wall part 1123 is thinner in the radial direction than the first wall part 1122. However, the radial thicknesses of the first wall part 1122 and the second wall part 1123 may be the same. The first wall part 1122 may be thinner in the radial direction than the second wall part 1123. By reducing the thickness of the second wall part 1123 in the radial direction, the increase in size of the motor 1 in the radial direction can be suppressed, and the amount of the coating agent that can enter the groove 1121 can be increased. In addition, the thickness of the first wall part 1122 in the radial direction can be increased so that the radially inner side of the circuit board 3 can be easily placed on the upper surface of the first wall part 1122.

The present disclosure can be widely used in, for example, a stator used in an outer rotor type motor. The present disclosure can be used, for example, in a centrifugal fan or the like provided to send wind into a vehicle seat.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator assembly for use in a motor, the stator assembly comprising:
    a stator having an annular shape and centered on a central axis extending vertically; and
    a circuit board above the stator in an axial direction; wherein
    the stator includes:
    a stator core including a plurality of teeth surrounding the central axis in an annular shape and extending in a radial direction;
    an insulator covering at least a portion of the stator core;
    a conductive wire wound around the teeth via the insulator to define a coil; and
    a terminal pin extending axially upward from an upper surface of the insulator and connected to an end portion of the conductive wire;
    the circuit board includes, on an upper surface, a solder portion that enables electrical connection with the terminal pin and is covered with a coating layer;
    the insulator is positioned radially inward from the circuit board and includes a groove that is recessed downward in the axial direction; and
    the groove and the terminal pin overlap in the radial direction in plan view from the axial direction;
    the circuit board includes a board inner end surface that radially faces the central axis inward in the radial direction;
    the insulator includes:
        a first wall portion including a cylindrical shape and provided radially inward of the insulator and extending in the axial direction; and
        a second wall portion positioned radially inward from the first wall portion and extending in the axial direction,
    the groove is defined by being surrounded by the first wall portion and the second wall portion;
    an upper surface of the first wall portion is positioned below a lower surface of the circuit board in the axial direction; and
    at least a portion of the board inner end surface is positioned radially inward from a radially outer end surface of the first wall portion and radially outward from a radially outer end surface of the second wall portion.

2. The stator assembly according to claim 1, wherein the groove is positioned axially below the upper surface of the circuit board and axially above an upper surface of the stator core.

3. The stator assembly according to claim 1, wherein the board inner end surface overlaps the upper surface of the first wall portion in the axial direction.

4. The stator assembly according to claim 1, further comprising:
    a bearing housing which is radially inward from the stator and holds a bearing; wherein
    a gap is provided between the second wall portion and the bearing housing in the radial direction.

5. The stator assembly according to claim 1, wherein an upper surface of the second wall portion is positioned below the upper surface of the first wall portion in the axial direction.

6. The stator assembly according to claim 1, wherein the groove is provided in an annular shape over an entire circumference in a circumferential direction.

7. The stator assembly according to claim 1, wherein the second wall portion includes a smaller radial thickness than the first wall portion.

8. The stator assembly according to claim 1, wherein
    a protruding portion protruding upward in the axial direction is provided on the upper surface of the first wall portion;
    a recess portion recessed radially outward is provided in the board inner end surface; and
    the protruding portion is in the recess portion.

9. The stator assembly according to claim 8, wherein
    the terminal pin is radially outward from the first wall portion; and
    the terminal pin and the protruding portion are different in circumferential position.

10. A motor comprising:
    the stator assembly according to claim 1; and
    a rotor including a magnet opposing the stator in a radial direction.

11. A blowing device comprising:
    the motor according to claim 10; and
    an impeller rotatable with the rotor.

* * * * *